(12) United States Patent
Oldnall

(10) Patent No.: US 11,187,261 B2
(45) Date of Patent: Nov. 30, 2021

(54) LINER BOLT

(71) Applicant: Craig Oldnall, Atwell (AU)

(72) Inventor: Craig Oldnall, Atwell (AU)

( * ) Notice: Subject to any disclaimer, the term of this patent is extended or adjusted under 35 U.S.C. 154(b) by 208 days.

(21) Appl. No.: 16/467,424

(22) PCT Filed: Dec. 4, 2017

(86) PCT No.: PCT/AU2017/051328
§ 371 (c)(1),
(2) Date: Jun. 6, 2019

(87) PCT Pub. No.: WO2018/102863
PCT Pub. Date: Jun. 14, 2018

(65) Prior Publication Data
US 2020/0072273 A1  Mar. 5, 2020

(30) Foreign Application Priority Data

Dec. 6, 2016  (AU) .................................. 2016905033

(51) Int. Cl.
*F16B 35/04* (2006.01)
*B02C 23/00* (2006.01)
*F16B 35/06* (2006.01)

(52) U.S. Cl.
CPC ............ *F16B 35/045* (2013.01); *B02C 23/00* (2013.01); *F16B 35/06* (2013.01); *B02C 2210/02* (2013.01); *F16B 35/04* (2013.01)

(58) Field of Classification Search
CPC .... F16B 5/0275; F16B 5/0283; F16B 35/045; F16B 35/06; F16B 39/14; F16B 39/24; F16B 39/34; F16B 39/36; F16B 35/04; Y10S 411/929; Y10S 411/935; Y10S 411/938; B02C 23/00; B02C 2210/02
USPC .......... 411/18, 259, 260, 265, 268, 388–389, 411/396–397, 402–403
See application file for complete search history.

(56) References Cited

U.S. PATENT DOCUMENTS

| | | | | |
|---|---|---|---|---|
| 2,631,488 A * | 3/1953 | Tansey | ..................... | F16B 35/06 411/402 |
| 3,492,906 A * | 2/1970 | Hauser | ..................... | F16B 37/12 411/389 |
| 4,536,115 A * | 8/1985 | Helderman | ........... | B25B 27/143 411/17 |
| 4,690,365 A * | 9/1987 | Miller | ..................... | F16B 5/0233 248/188.4 |
| 6,048,150 A * | 4/2000 | Clarke | .................. | F16B 35/048 411/187 |
| 8,641,343 B2 * | 2/2014 | Mitrovic | ............... | F16B 37/122 411/338 |

(Continued)

*Primary Examiner* — Roberta S Delisle
(74) *Attorney, Agent, or Firm* — Tope-McKay & Associates

(57) ABSTRACT

A liner bolt (10) comprising an elongate stud (12) and a head (14) engageable with a first end (16) of the stud (12). The head (14) including an inwardly tapered first end portion (24) adjacent a first end (21) thereof. A threaded portion (18) is provided adjacent a second end (17) of the stud for receiving a nut (20). The first end (21) of the head (14) includes an inwardly tapered opening (28) having an internal thread (30) and the first end (16) of the stud (12) includes an inwardly tapered end portion (32) having an external thread (34) such that the first end (16) of the stud (12) is engageable in the opening (28) in the head (14).

12 Claims, 5 Drawing Sheets

(56) References Cited

U.S. PATENT DOCUMENTS

2006/0104742 A1* 5/2006 Fleming ................ F16B 5/0275
411/389
2007/0053766 A1* 3/2007 Lin ....................... F16B 5/0275
411/389

* cited by examiner

LINER BOLT

FIELD OF THE INVENTION

The present invention relates to a liner bolt for securing a sacrificial wear surface, such as a liner within a grinding mill.

BACKGROUND TO THE INVENTION

Grinding mills use liners which are secured to the inner surface of the mill by liner bolts. The liners provide both a protective surface, as well as surface features to assist with the grinding process.

As the liners wear, it is necessary to periodically replace the liners. Liner bolts commonly comprise a shaft having a widened head which is received through a hole in the liner from the inside. The end of the liner bolt extends to the outside of the mill, where it is secured by a nut. When it is time to replace the liners, the nuts are removed and the bolts pushed inwardly into the inside of the mill. As these bolts can become jammed within the liner during operation of the mill, pushing the bolts inwardly will often require the use an impact tool used to drive the bolt inwardly. Alternatively, the bolts may be driven by placing a rod against the outer end and driving with a hammer.

The use of such impact tools can pose hazards to the operators and result in injury. Further, the time taken to drive in the bolts can be significant. As any time in which a mill is not operating results in increased costs, it is therefore important to ensure that the replacement of the liners can be achieved as efficiently as possible.

A quick release liner bolt has been proposed in International patent publication number WO 2013116892. This liner bolt includes an inner bolt part received inside the liner and the shell of the mill which includes a threaded aperture in an outer end. A threaded outer bolt is received into this aperture from outside the mill. Removal of the liner bolt therefore involves rotation of the outer bolt part to separate it from the inner bolt part. Such an arrangement creates a narrowed portion of the outer bolt which is located around the join between the shell and the liner. Such an arrangement can lead to failures in use.

The present invention relates to a liner bolt having a construction aimed at allowing removal of the liner via rotation of the outer part of the bolt, rather than impact, in a form which can support sufficient load to reduce the likelihood of breakages during operation of the mill.

SUMMARY OF THE INVENTION

According to one aspect of the present invention there is provided a liner bolt comprising:
an elongate stud;
a head having a first end engageable with a first end of the stud, the head including an inwardly tapered first end adjacent the first end thereof; and a threaded portion provided adjacent a second end of the stud for receiving a nut; wherein the first end of the head includes an inwardly tapered opening having an internal thread and the first end of the stud includes an inwardly tapered end portion having an external thread such that the first end of the stud is engageable in the opening in the head.

Preferably the stud includes a tool engagement at the second end thereof for engagement by a rotating tool.

Preferably the head includes a first end portion which tapers inwardly towards the first end of the head and a second end portion having a constant transverse cross section.

In a preferred embodiment, the second end portion of the head is obround in transverse cross section.

Preferably the first end portion of the head tapers inwardly in respect of height and not width.

Preferably the first end portion is obround in transverse cross section throughout its length and circular in transverse cross section at the first end of the head.

In a preferred embodiment, the tool engagement comprises a square drive socket provided in the second end of the stud.

BRIEF DESCRIPTION OF THE DRAWINGS

The invention will now be described, by way of example, with reference to the following drawings, in which.

DETAILED DESCRIPTION OF PREFERRED EMBODIMENTS

Figure 1:
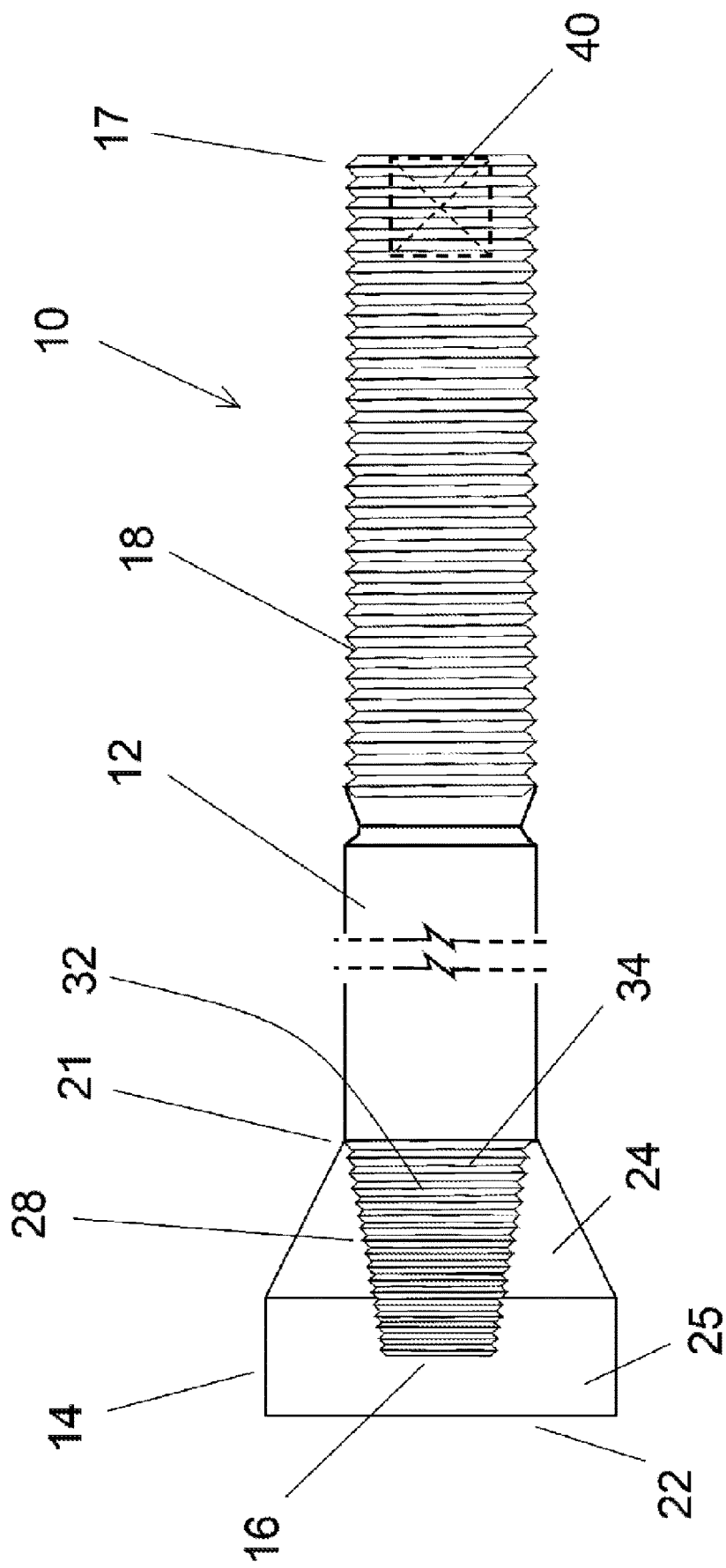
FIG. 1 is a side view of a liner bolt in accordance with the present invention.
Figure 2:
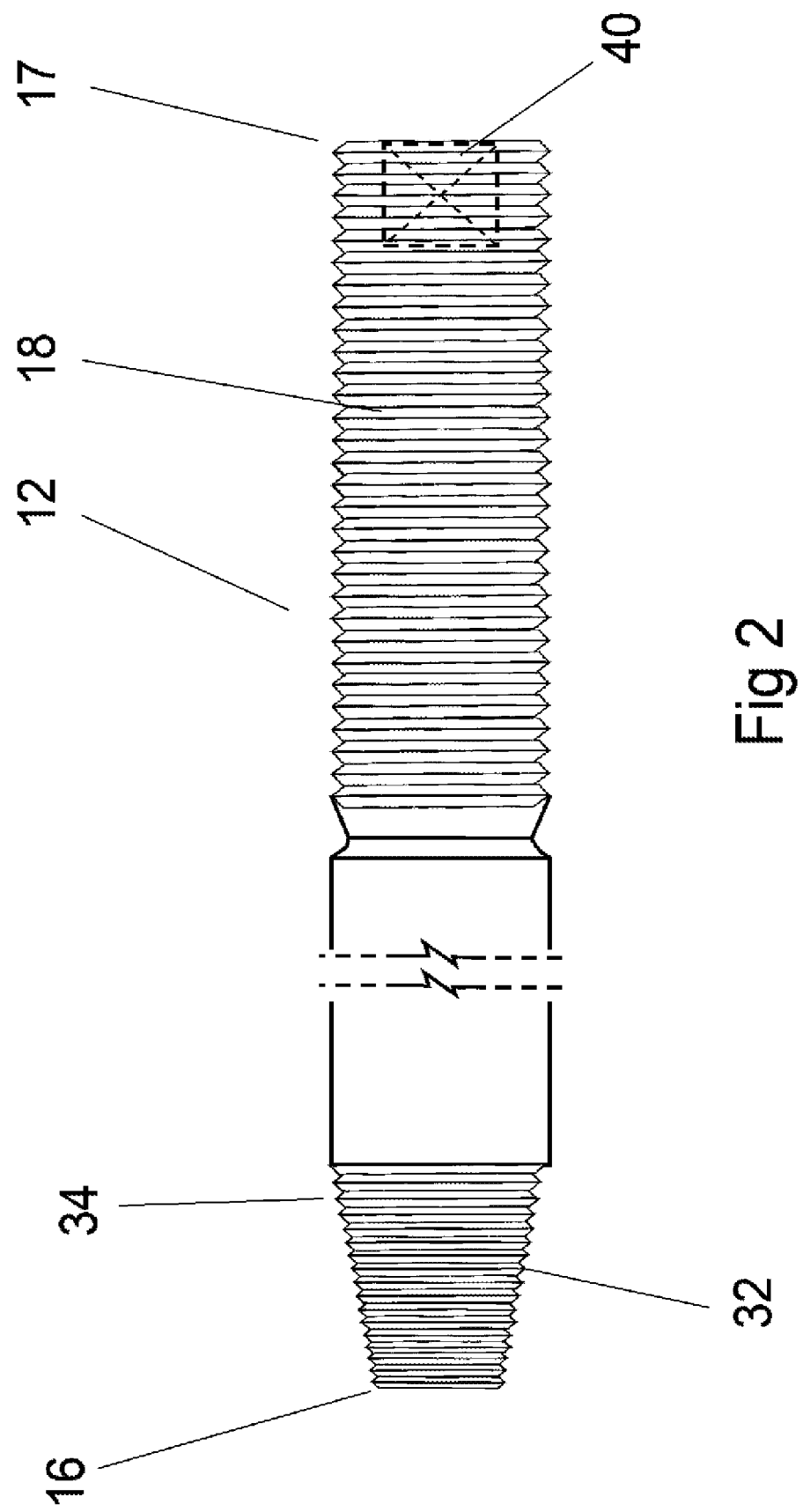
FIG. 2 is a side view of the stud of the liner bolt of FIG. 1.

Referring to the Figures, there is shown a liner bolt 10 comprising an elongate stud 12 and a head 14. The head 16 is engageable with a first end 16 of the stud 12 to form the liner bolt 10. The liner bolt 10 is to be used to secure a liner plate 11 to an outer shell 13 of a grinding mill.

The stud 12 comprises an elongate member of circular cross-section. The stud 12 includes a threaded portion 18 adjacent a second end 17 thereof. The threaded portion 18 is provided for receiving a nut 20 in use. The second end 17 of the stud 12 protrudes outwardly from the shell 13 of the mill such that engaging the nut 20 to the threaded portion 18 of the liner bolt 10 engages the liner bolt 10 with the liner plate 11 such that the liner plate 11 is secured to an inner surface of the shell 13.

The stud 12 includes also a tool engagement 40 at the second end 17 thereof. The tool engagement 40 is provided to allow application of a rotational force to the stud 12 by a suitable tool. In the embodiment shown, the tool engagement 40 comprises a square drive socket provided in the second end of the stud 12.

The head 14 includes a first end 21 and a second end 22. The head 14 includes a first end portion 24 adjacent the first end 21 which tapers inwardly towards the first end 21 of the head 14. The head 14 includes also a second end portion 25 extending from the first end portion 24 to the second end 22. The second end portion 25 has a constant transverse cross section.

Figure 3B:
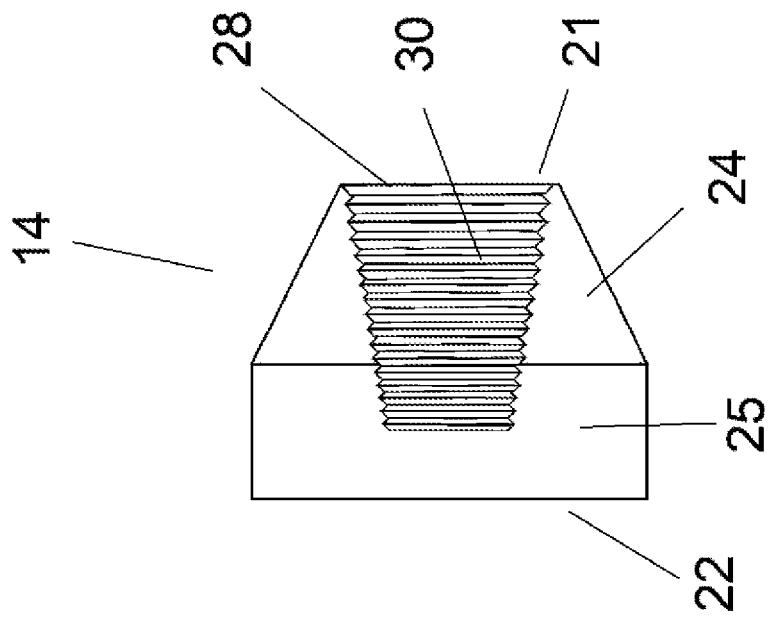
FIG. 3b is a side cross sectional view of the head of the liner bolt of FIG. 1.
Figure 3A:
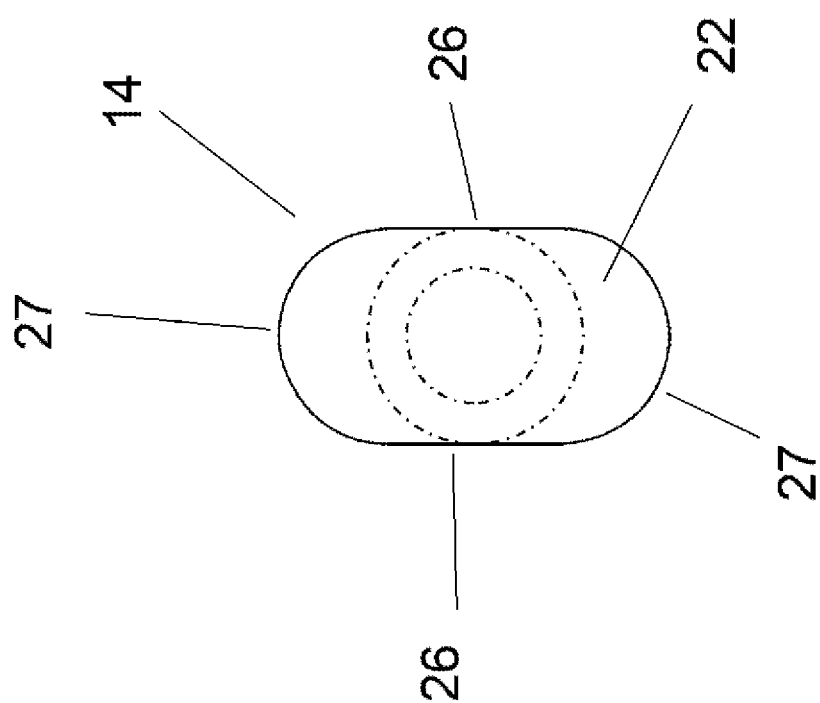
FIG. 3a is an end view of the head of the liner bolt of FIG. 1.

As can be seen in FIG. 3a, the second end portion 25 of the head 14 is obround in transverse cross section. That is, the head 14 adjacent the second end portion 25 comprises linear parallel side walls 26 connected at opposed ends by arcuate end walls 27. The first end portion 24 of the head 14 tapers inwardly in respect of the height only (being the distance between the end walls 27) and not the width (being the distance between the side walls 26). The first end portion 24 is therefore also obround in transverse cross section with the first end portion 24 reducing in cross sectional area such that the first end portion 24 is circular in transverse cross section at the first end 21 of the head 14.

The head 14 includes an opening 28 in the first end 21 thereof. The opening 28 is circular in transverse cross section and tapers inwardly such that an inner end thereof has a smaller diameter than an outer end thereof. The opening 28 includes an internal thread 30 on an inner surface thereof. The first end 16 of the stud 12 includes a tapered end portion 32 at the first end 16 thereof. The tapered end portion 32 also tapers inwardly corresponding to the inward taper of the opening 28, such that the tapered end portion 32 may be received within the opening 28. The tapered end portion 32 of the stud 12 includes an external thread 34 thereon. The external thread 34 is complementary to the internal thread 30 such that the first end 16 of the stud 12 may be screwed into the opening 28 in the head 14.

Figure 4:
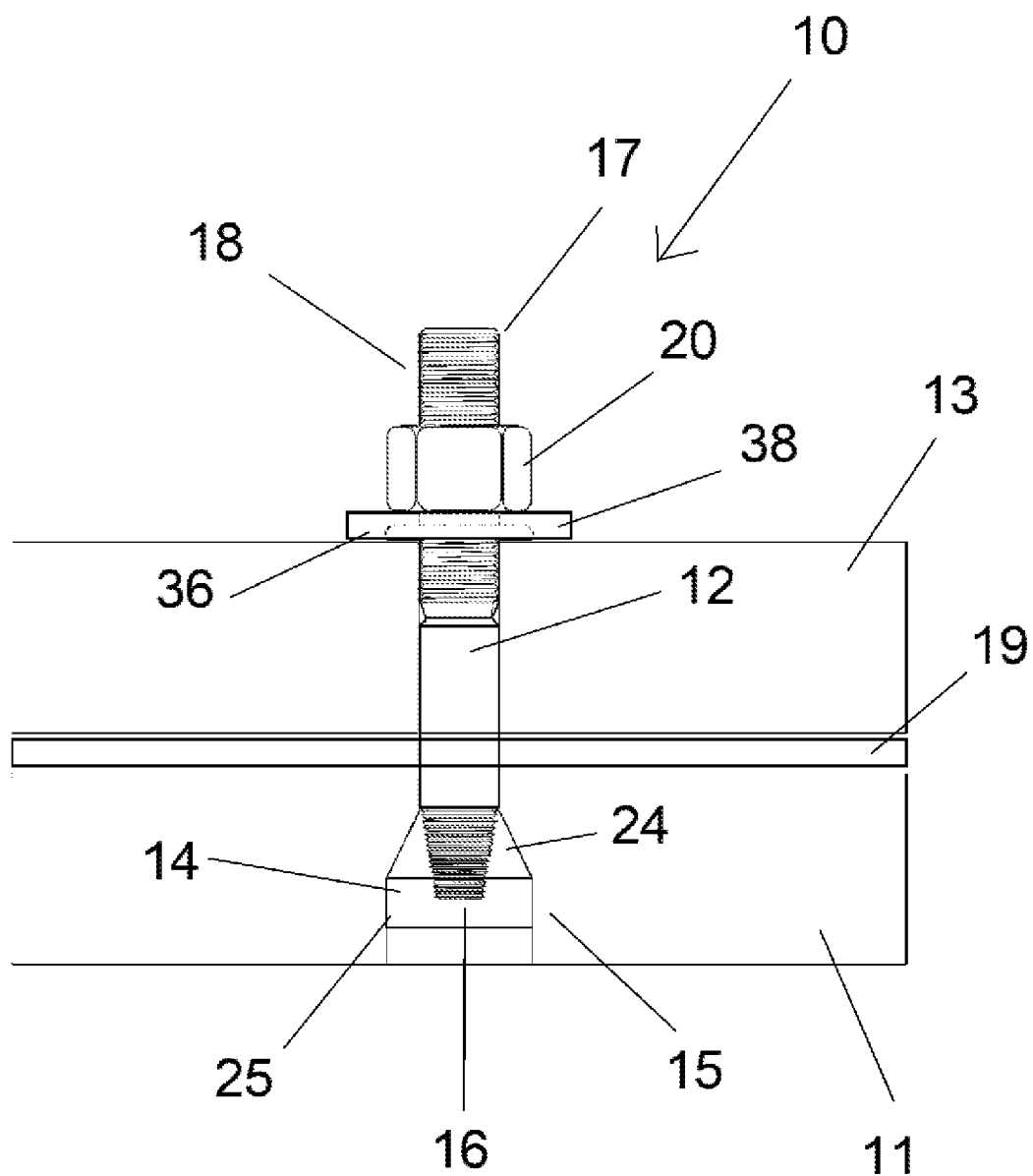
FIG. 4 is a side cross-sectional view of the liner bolt of FIG. 1 installed in a mill.
Figure 5:
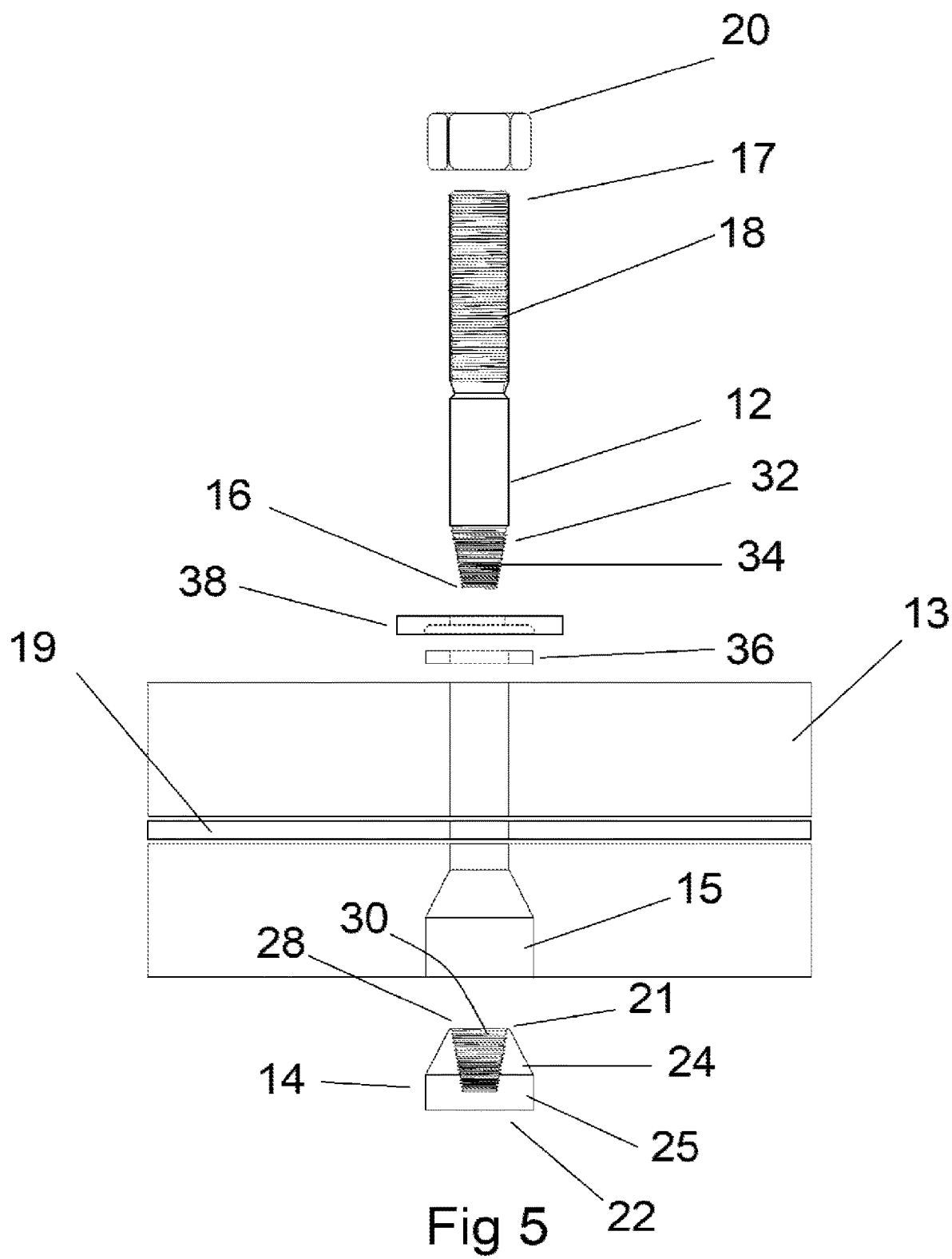
FIG. 5 is a side cross-sectional view of the liner bolt of FIG. 1 disengaged from the mill.

FIG. 4 shows the liner bolt 10 engaged in a mill to secure the liner plate 11 to an inner surface of the shell 13. The liner bolt 10 is provided with the head 14 connected to the stud 12 and inserted into an aperture 15 in the liner plate 11 from the inside of the mill. The aperture 15 in the liner plate 11 aligns with a hole in the shell 13 such that the second end 17 of the stud 12 passes outwardly to the exterior of the shell 13. A seal 36 and a washer 38 may be placed over the second end of the stud 12 and the nut 20 is then secured to the threaded portion 18 of the liner bolt 10. Tightening the nut 20 pulls the liner plate 11 towards the inner surface of the shell 13. A compressible lining 19 is provided between the liner plate 11 and the shell 13. The liner plate 11 is secured in position against the inner surface of the shell 13 by tightening the nut 20 on the liner bolt 10.

When it is required to remove the liner bolt 10, a spanner or other suitable tool may be engaged with the nut 20. A tool is then engaged with the tool engagement 40 to rotate the stud 12 relative to the nut 20. Due to the shape of the head 14, the head 14 will not rotate within the liner plate 11 and the stud 12 therefore rotates relative to the head 14. This rotation unscrews the stud 12 from the head 14, thereby allowing the line plate 11 and head 14 to disconnect and fall away from the inner surface of the shell 13.

This arrangement therefore allows disconnection of the liner plate 11 by rotation only of the stud 12 from externally of the shell 13. The use of a tapered threaded engagement between the first ends of the stud 12 and the head 14 within the liner plate 11 removes potential weakened areas and therefore allows the connection to be sufficiently strong to support the required loads.

It will be readily apparent to persons skilled in the relevant arts that various modifications and improvements may be made to the foregoing embodiments, in addition to those already described, without departing from the basic inventive concepts of the present invention.

What is claimed is:

1. A liner bolt comprising:
an elongate stud;
a head having a first end engageable with a first end of the stud, the head including an inwardly tapered first end portion adjacent the first end thereof; and
a threaded portion provided adjacent a second end of the stud for receiving a nut;
wherein the first end of the head includes an inwardly tapered opening having an internal thread and the first end of the stud includes an inwardly tapered end portion having an external thread such that the first end of the stud is engageable in the opening in the head.

2. The liner bolt in accordance with claim 1, wherein the stud includes a tool engagement at the second end thereof for engagement by a rotating tool.

3. The liner bolt in accordance with claim 2, wherein the head includes a first end portion which tapers inwardly towards the first end of the head and a second end portion having a constant transverse cross section.

4. The liner bolt in accordance with claim 3, wherein the second end portion of the head is obround in transverse cross section.

5. The liner bolt in accordance with claim 4, wherein the first end portion of the head tapers inwardly in respect of height and not width.

6. The liner bolt in accordance with claim 5, wherein the first end portion is obround in transverse cross section throughout its length and circular in transverse cross section at the first end of the head.

7. The liner bolt in accordance with claim 6, wherein the tool engagement comprises a square drive socket provided in the second end of the stud.

8. The liner bolt in accordance with claim 2, wherein the tool engagement comprises a square drive socket provided in the second end of the stud.

9. The liner bolt in accordance with claim 3, wherein the tool engagement comprises a square drive socket provided in the second end of the stud.

10. The liner bolt in accordance with claim 4, wherein the tool engagement comprises a square drive socket provided in the second end of the stud.

11. The liner bolt in accordance with claim 5, wherein the tool engagement comprises a square drive socket provided in the second end of the stud.

12. The liner bolt in accordance with claim 1, wherein the head includes a first end portion which tapers inwardly towards the first end of the head and a second end portion having a constant transverse cross section.

* * * * *